United States Patent
Henty et al.

(10) Patent No.: US 8,194,038 B1
(45) Date of Patent: Jun. 5, 2012

(54) MULTI-DIRECTIONAL REMOTE CONTROL SYSTEM AND METHOD WITH AUTOMATIC CURSOR SPEED CONTROL

(75) Inventors: David L. Henty, Newport Beach, CA (US); Christopher Cooper, North Vancouver, CA (US)

(73) Assignee: I-Interactive LLC, Irvine, CA (US)

( * ) Notice: Subject to any disclaimer, the term of this patent is extended or adjusted under 35 U.S.C. 154(b) by 295 days.

(21) Appl. No.: 12/721,274

(22) Filed: Mar. 10, 2010

Related U.S. Application Data (60) Provisional application No. 61/159,045, filed on Mar. 10, 2009.

(51) Int. Cl.
*G06F 3/033* (2006.01)
*G08C 21/00* (2006.01)

(52) U.S. Cl. ...... 345/158; 345/166; 345/179; 178/19.05

(58) Field of Classification Search .......... 345/156–158, 345/160, 163, 166, 168–169, 172, 179; 348/734; 178/19.05
See application file for complete search history.

(56) References Cited

U.S. PATENT DOCUMENTS

| | | | | |
|---|---|---|---|---|
| 2001/0045940 | A1* | 11/2001 | Hansen | 345/158 |
| 2004/0207597 | A1* | 10/2004 | Marks | 345/156 |
| 2005/0260986 | A1* | 11/2005 | Sun et al. | 455/433 |

* cited by examiner

*Primary Examiner* — Lun-Yi Lao
*Assistant Examiner* — Jarurat Suteerawongsa (57) ABSTRACT

A multi-directional remote control system and method is adapted for use with an entertainment system of a type including a display such as a monitor or TV and having display functions employing a mouse type control. The remote controller may be conveniently held in one hand of a user and still provides full mouse type functionality. The remote control system and method images the controller to detect relative motion between the controller and screen. This position information is used for control of a cursor or other GUI interface with automatic control of cursor speed based on detected controller distance from the screen and characteristic hand movement.

10 Claims, 10 Drawing Sheets

MULTI-DIRECTIONAL REMOTE CONTROL SYSTEM AND METHOD WITH AUTOMATIC CURSOR SPEED CONTROL

RELATED APPLICATION INFORMATION

The present application claims priority under 35 USC 119(e) to U.S. provisional application Ser. No. 61/159,045 filed Mar. 10, 2009, the disclosure of which is incorporated herein by reference in its entirety.

BACKGROUND OF THE INVENTION

1. Field of the Invention

The present invention relates to remote control systems for controlling entertainment systems, such as televisions, multimedia systems, Internet access systems and browsers, and related methods.

2. Description of the Prior Art and Related Information

A need has arisen for providing multi-directional mouse type control capabilities in the living room along with the ability to control the conventional entertainment devices typically present in the living room. For example, combined PC and TV systems have been introduced which integrate the capabilities of the personal computer with the television. One such system is described in U.S. Pat. No. 5,675,390. Also, set top Internet access devices have been introduced which integrate Internet access capabilities with conventional televisions. The ability to provide full control of a PC or an Internet browser typically requires the use of a keyboard and a multi-directional controller such as a mouse. A conventional remote control is therefore inadequate for control of such combined entertainment systems. Also, the advent of digital video recorders (DVRs), wireless networking systems for video, audio and picture transfer to TVs, and other digital devices linked to the TV has introduced many more functions to TV control, including complex display menus, introducing a need for a better remote control interface.

Wireless keyboards are one addition to the conventional remote control in the living room that have been introduced to allow the user of a combined PC and TV system or the user of a TV Internet access device to provide convenient text input, for example for creating emails or searching. However, convenient control of PC type functions also requires an ability to interface with a Graphical User Interface (GUI). To address this need wireless keyboards may include an up-down-left-right control to move around in a limited GUI interface. This type of up-down-left-right control is also typically added to conventional remotes and used to navigate a cable TV menu or digital TV peripheral device menu, such as a DVR. This type of up-down-left-right control is more restricted and clumsy to use than a mouse type controller and limits the flexibility of a GUI interface and the menu layout. Alternatively, wireless keyboards may include an integrated trackball or other pointing device to provide mouse type control of the PC or Internet functions. These types of multi-directional controls are less natural and convenient to use than a separate mouse controller. Also, such systems require both hands to use making simple one handed navigation of a GUI TV interface impossible. A wireless mouse controller is an option, however, a mouse requires a clean flat surface within easy reach and is not convenient for a living room setting. Some attempts have been made to provide a mouse type controller suitable for living room use, for example, using gyroscopic motion detection, however such controllers suffer from various problems such as cost, complexity and lack of naturalness of use. Furthermore, to provide all the desired types of controls of a PC/TV entertainment system three separate wireless remote controls would be needed, a hand-held remote control, a wireless keyboard and a freely movable mouse type control. This of course introduces undesirable cost, a confusing number of control functions, and clutter in the living room.

Accordingly, the addition of complex digital devices as well as PC and/or Internet access capabilities to the conventional TV based entertainment system has introduced the problem of controlling such systems with a convenient yet full function remote control system.

SUMMARY OF THE INVENTION

In one aspect the present invention provides a method of remotely controlling position of a cursor or other object displayed on a display. The method comprises imaging an area in front of the display, the area including a user movable remote control having an LED, detecting the LED location in the image, detecting the size of the LED, imaging the area to obtain a new image, detecting a new LED location in the new image, and comparing the new location of the LED to the prior LED location to control movement of a cursor or other object displayed on the display with an amount of movement based on the LED size.

In one preferred embodiment of the method the cursor movement is controlled linearly with LED movement. Alternatively, the cursor movement is controlled nonlinearly with LED movement. Also, the amount of cursor movement may be varied between horizontal and vertical LED movement in the image. More specifically, the amount of movement is increased as the detected LED size decreases. Preferably the amount of movement is increased with estimated distance based on the detected LED size compared to the known LED size. For example, the amount of movement may be given by the relation Movement Speed=Distance*Scale Factor*Mapping(Displacement), where Scale Factor is a user settable constant based on the user preference for overall cursor speed, Displacement is the horizontal and vertical displacement of the LED in the image relative to the start location, and the Mapping function allows a linear or non-linear mapping of LED displacement to cursor displacement. The movement control may be performed by averaging over a predetermined time to prevent any rapid changes due to variations in the measurement of LED size. The size of the LED may be determined by measuring the diameter of the detected LED at multiple angles. For example, the smallest diameter over all angles may be taken as the size of the LED.

Further aspects of the invention are described in the following detailed description.

DETAILED DESCRIPTION OF THE INVENTION

The disclosures of U.S. utility patent application Ser. No. 11/255,647 filed Oct. 21, 2005, PCT application PCT/US2006/041306, filed Oct. 23, 2006, now assigned utility patent application Ser. No. 12/083,811, and provisional application Ser. No. 61/159,001 filed Mar. 10, 2009, are incorporated herein by reference in their entirety.

Figure 1:
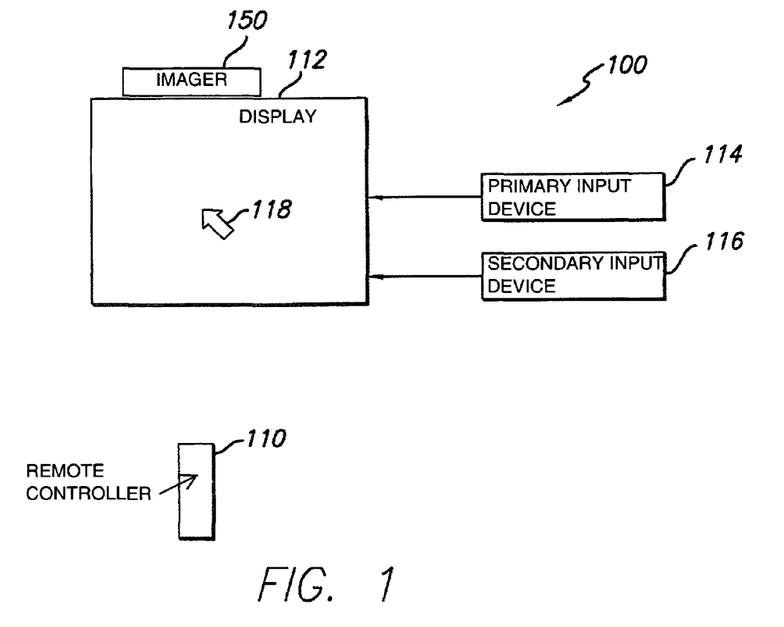
FIG. 1 is a perspective view of an improved entertainment system in accordance with the present invention in a presently preferred embodiment.

The present invention provides a remote control system and method adapted for use with an entertainment system employing a multi-directional control function such as a GUI control interface. Any such multi-directional control capability is referred to herein, for shorthand purposes only, as a GUI interface. In FIG. 1 an improved entertainment system in accordance with the present invention is illustrated in a perspective view in a presently preferred embodiment. Details of such systems beyond the novel control features described herein are known and will not be described in detail herein. For example, a PC/TV system with internet access is one example of such an entertainment system and is disclosed in the above noted '390 patent, the disclosure of which is incorporated by reference in its entirety.

In one embodiment this invention is directed to a system and method for moving a cursor on a screen of a display by analyzing images of one or more LEDs contained in a handheld remote control captured by a stationary camera in proximity to the screen. The user presses and holds a predefined button on the remote control to move the cursor. The signal from the remote control activates a tracking algorithm on a microprocessor, which analyzes captured images of the LEDs to calculate a displacement for the cursor and move the cursor. When the user releases the predefined button, the tracking algorithm stops.

Referring to FIG. 1, the entertainment system 100 includes a multi-directional remote controller 110, a display 112, which for example may be a TV or monitor, a primary display control/input device 114 and a secondary display control/input device 116. Primary display control/input device 114 and secondary display control/input device 116 may comprise any of a variety of devices using a TV or display for output. Primary control/input device 114 is adapted for a GUI interface control displayed on the display 112. For example, the primary input device 114 may comprise a multi-media PC such as in the above noted '390 patent or other device adapted for utilizing a multi-directional control, such as a GUI interface. Other examples of primary input device 114 include digital cable or satellite TV boxes, DVR systems, networked digital media systems adapted for media transfer from a networked PC, internet steaming media devices, digital video game players, etc. A variety of possible devices may therefore comprise primary input device 114. Furthermore the functionality of input device 114 may be incorporated in the display system 112 and is simply illustrated as a separate device for illustration of one possible configuration. Secondary input device 116 may also comprise any of a variety of known devices employed in entertainment systems and may include a DVR, cable TV box, or other digital or combined analog and digital interface device. Device 116 may incorporate a GUI type interface or a more conventional interface for TV systems adapted for, e.g. a push button LED remote control. Also, the functionality of device 116 may be incorporated along with device 114 or display 112 and again the illustration of a separate input device is purely for illustration of a possible configuration and without limitation. Plural devices 114, 116 are shown to clarify that the control system of the present invention may control a conventional device as well as a GUI device, with an (optional) combined universal remote/multi-directional control capability in one embodiment of a controller 110 as described below.

System 100 includes an imager or camera 150 which receives light in its field of view including IR light from conventional IR LED(s) in controller 110. Imager 150 may comprise a suitable commercially available digital imager, for example commercially available imagers providing relatively high-quality digital images and which are sensitive to IR light are available at relatively low cost and may be advantageously employed for imager 150. The output of imager 150 will be image data corresponding to the pixels in the field of view of the imager 150, which field of view is suitably chosen to encompass the area in front of the controller including the controller 110 shown in FIG. 1. An IR filter may advantageously be provided in front of the imager or incorporated in the camera lens assembly to reduce background image while passing the IR light from controller 110. The pixel data output from imager 150 is provided to a processor in device 114 which may be a suitably programmed general purpose processor, forming part of a PC for example, programmed in a manner to provide the image processing and cursor control functions described in more detail below.

Remote controller 110 in combination with the imager and image data processing provides a multi-directional control capability which is schematically illustrated by control of cursor 118 displayed in the monitor 112. The image data may be processed to provide absolute pointing position control over cursor 118 or the data may provide movement control over the cursor corresponding to changes in image position between frames. It should be appreciated however that a variety of different multi-directional control interfaces may be employed other than a cursor such as in a typical mouse control of a PC. For example the multi-directional controller 110 may control highlighting and selection of different icons or other GUI interface layouts displayed on the screen of display 112 by device 114 and/or device 116. Also, the multi-directional controller could simply enable rapid scrolling through large channel lists such as in digital cable menus without the tedious up-down-left-right scrolling typically employed. As will be described in more detail below, remote controller 110 thus provides a freely movable multi-directional motion based control similar to a mouse control of a PC but without being limited to use on a flat surface.

Figure 2:
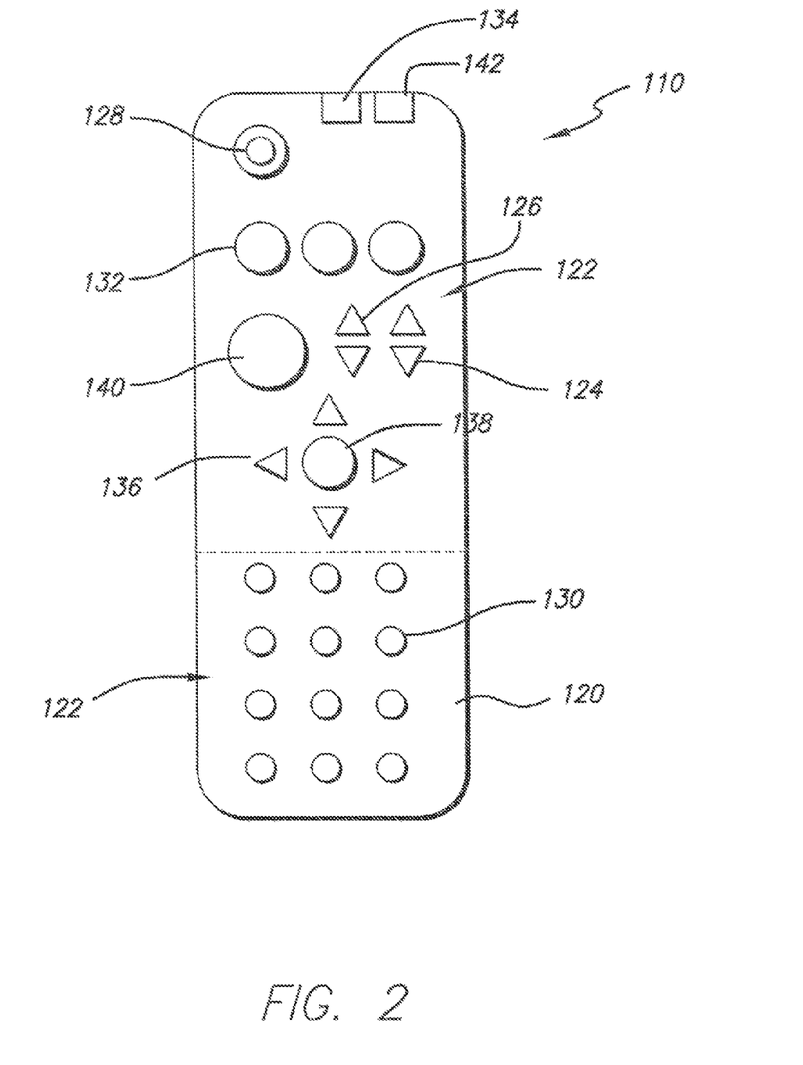
FIG. 2 is a top view of the remote controller of the present invention in a presently preferred embodiment.

Referring to FIG. 2, the remote controller 110 is illustrated in more detail in a top view. As shown, the remote controller may have a configuration similar to a typical remote control employed in an entertainment system. Alternatively, the controller 110 may have a shape more similar to a mouse type controller or other desirable ergonomic configuration adapted for use in one hand in a living room setting. The top surface of the controller housing 120 may include a number of first remote control inputs indicated generally at 122. This first set of control inputs 122 may include conventional remote control functions typically found in hand-held TV remote controls or universal remote controls adapted to control multiple entertainment devices such as TVs, DVRs, CD players, DVD players, etc. Therefore the first set of remote control inputs 122 may include the volume up and down set of controls 124, a channel up and down set of controls 126, a power button 128 and a set of numeric inputs 130. Also, a number of programmable or special purpose control buttons may be provided that are indicated generally as buttons 132. As further illustrated in FIG. 2, the first set of controls 122 preferably include conventional up, down, left, right (UDLR) navigation buttons 136 and an OK or Select button 138 which together provide conventional navigation of a menu. The first set of controls 122 activate a conventional IR LED wireless transmitter 134 configured at one end of the housing 120. A button 140 is preferably provided to activate the multi-directional control capability of the controller 110 by transmitting a control signal to device 114 via IR transmitter 134. This may at the same time cause the control input device 114 to display cursor 118 and/or a suitable menu adapted for multi-directional control on the display screen 112. The imager 150 detects the IR signal from the controller and moves the cursor. With the multi-directional control by image data processing the remote 110 thus provides dual mode navigation in a simple conventional remote configuration.

Although one button 140 is shown several menu buttons may be provided which enable display of the appropriate menu and at the same time enable the multi-directional control capability. Also some or all of the functions of inputs 122 may be allocated to GUI control on the screen. The controller 110 may also provide various degrees of enhanced "universal control" GUI capability over various devices, such as device 116 or TV 112 as described in more detail in the above noted '647 and '811 applications.

Figure 3:
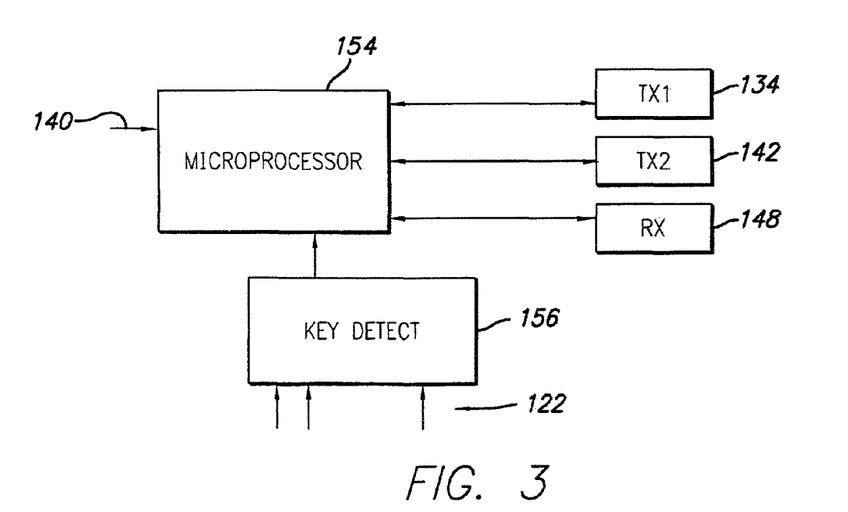
FIG. 3 is a block schematic diagram illustrating control circuitry of the remote controller of the present invention.

Referring to FIG. 3, a block schematic diagram is illustrated showing the circuitry of the remote controller. As shown in FIG. 3, the controller circuitry includes microprocessor (or microcontroller) 154 which controls IR transmitter 134 to transmit signals to the output control device 114 (or 116) shown in FIG. 1 in response to activation of keys 122 (shown in FIG. 2) provided from key detect circuit 156. Microprocessor 154 may also store codes for universal control operation. An (optional) receiver 148 may also be provided, e.g. to receive a signal from device 114 with information from device 114, e.g. to customize the control functions for different GUI interfaces. If device 114 has a networked wireless interface, such as a WiFi interface, controller 110 may also employ this protocol and be networked with device 114. Microprocessor 154 also receives as an input the control signal from switch 140 which, as described in detail in FIG. 5, may transmit a control signal from transmitter 134 to activate a menu or other interface signaling activation of the multi-direction controller function and a GUI interface. A single IR transmitter may be employed for transmitting both modulated control signals and a IR signal for tracking under the control of microprocessor 154. Two transmitters 134 and 142 may be advantageously employed however were the control signals from switches 122 provide a conventional LED type control signal which may be used for standard remote protocols and IR transmitter 142 provides a signal better adapted for tracking, for example, having a different transmission scheme with less or no off modulation for easier tracking or a wider beam pattern or higher power. Also, both IRs 134, 142 may be activated simultaneously during tracking operation for added brightness and to provide a two LED image as an aid in detection and tracking.

Figure 4:
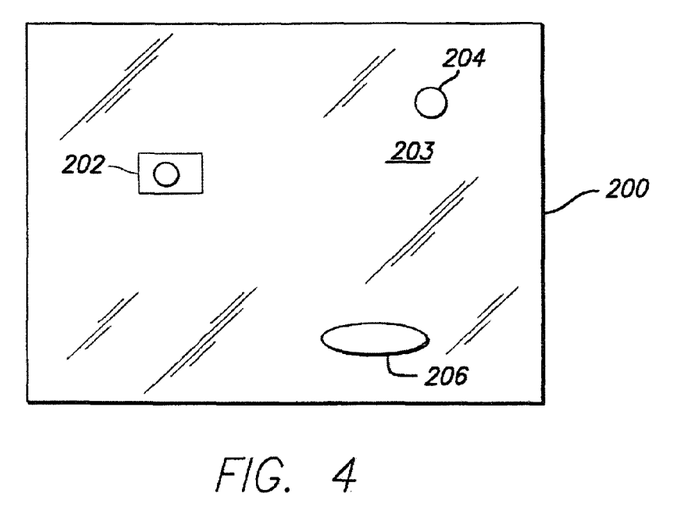
FIG. 4 is a schematic diagram illustrating the image data captured by the imager of FIG. 1.

Next, referring to FIGS. 4-6 the image processing implemented by processor 328 in FIG. 7 will be described in more detail. First of all, referring to FIG. 6 the first stage in the image processing is to capture a frame of image data as illustrated at 300. In FIG. 4 the image data captured by imager 150 is illustrated. As shown, the field of view 200 includes image data (pixels) 202 corresponding to the desired object (remote control 110 shown in FIG. 1) as well as background image data 203. The image data 202 has several characteristics which distinguish it from the background and which allow it to be reliably detected by the image processing software. These characteristics include the following: the image data 202 will be brighter than the background (after IR filtering); the image data 202 will not be static (the remote will be in motion); and the IR within image region of interest 202 will have a round shape. These characteristics may be employed to eliminate the irrelevant background images and clearly discern the image 202. Next, referring to FIG. 6, at 302, the image processing flow proceeds to eliminate background image data and isolate the image data 202. This processing employs some or all of the above noted unique characteristics of the image 202 to eliminate the background image data. In particular, as shown in FIG. 4 by the shaded area, a majority of the background image data 203 will have a brightness substantially less than image data 202 and this portion of the background can be rejected by rejecting the pixel data below a reference brightness threshold. The remaining groups of image data will correspond to relatively bright objects which may occur in the field of view, illustrated for exemplary purposes in FIG. 4 by image data 204, 206. For example, such image data may correspond to a bright object such as a lamp's image data 204. Also, reflected image data 206, for example corresponding to a reflection off of a coffee table or other reflective surface in the field of view may be present. Image data 204 and 206 may be readily eliminated by using shape and movement selective processing described in more detail in application Ser. No. 61/159,001 incorporated by reference in its entirety. Additional characteristics of the desired data 202 may be used if necessary. Also, reflections of the remote LED itself may be eliminated by doing a comparison of the brightness of the two images and selecting the brighter of the two objects. Furthermore, the reflections may be substantially eliminated from the image data by employing a polarized filter in the lens assembly 144.

In the unlikely event that the image processing locks onto an incorrect object a simple reset may be provided, e.g. simply releasing button 140 or some other manually activated input. This allows the user to reset the image tracking system, for example if it inadvertently locks onto a window in a room, after pointing the controller at the display screen and hitting a reset button.

Figure 5:
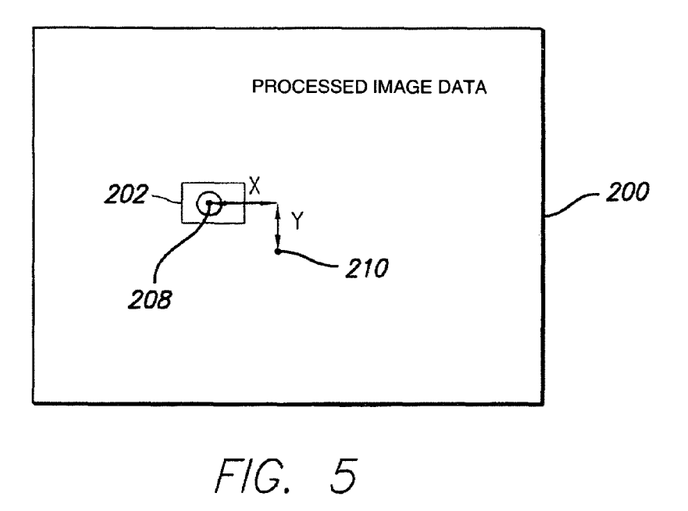
FIG. 5 is a schematic diagram illustrating the image data after background processing, which image data corresponds to the desired image data, and derived relative position information.
Figure 6:
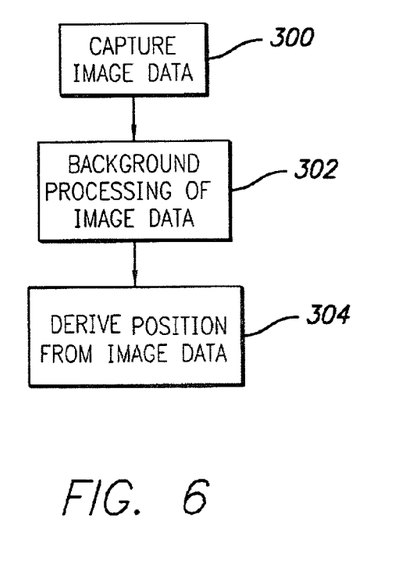
FIG. 6 is a flow diagram illustrating the processing of image data by the system of the present invention.

After the above noted processing the remaining image data corresponds to the desired image data 202, namely an area of interest surrounding the remote LED, as generally illustrated in FIG. 5. The processing flow then proceeds to derive the center of the image from this remaining image data at processing step 304, illustrated in FIG. 6. The process flow next proceeds to derive the relative position of the center of the detected image 208 to the center 210 of the field of view 200 (and the center of the optical axis of the imager lens assembly). As shown in FIG. 5, this offset information may be readily calculated from the image center pixel information derived previously and offset values X,Y may be derived as shown. Alternatively, purely image feature motion detection may be used for the multi-directional control, without employing the relative position offset of the imager axis to the detected image feature. Instead changes in the position of the detected image feature between frames may be used to provide motion control. The position information determined at 304 may then be just the change in image position from a prior frame. However, while the approach using imager axis offset information allows either pointing position based or motion based control, this approach only allows the latter.

Figure 7:
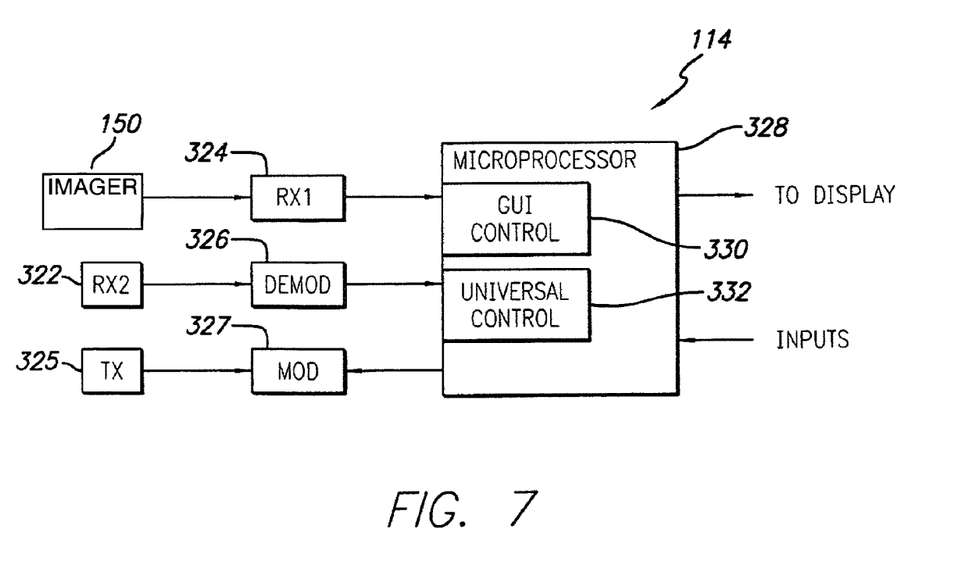
FIG. 7 is a simplified schematic of the display control/input device of the system of FIG. 1.
Figure 8:
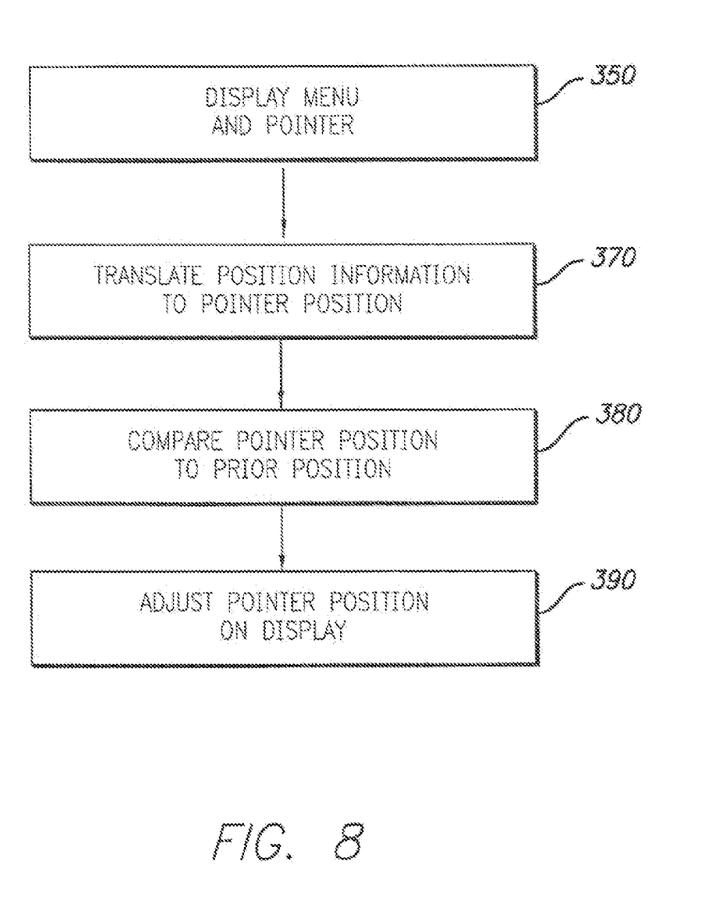
FIG. 8 is a flow diagram illustrating the process flow of the display control/input device for converting detected position data to a cursor or other GUI multi-directional control function.

Next, referring to FIGS. 7 and 8 the control processing using the position data, is shown.

As shown in FIG. 7 the input device 114 will include a receiver 324 for receiving the image data from camera 150, which may be a standard port if a wired connection to the camera is provided. An IR receiver 322 is provided for receiving the remote control input signals from the control inputs 122 on the remote control and also from the multi-directional control button 140. The receiver 322 is coupled to suitable demodulation and amplification circuits 326, which in turn provide the received demodulated IR transmitted data to a microprocessor 328. A transmitter 325 and modulator 327 may also be provided to communicate with the controller 110 or a networked wireless device. Microprocessor 328 will perform a number of functions which will depend on the particular device and will include functional block 330 for providing image processing and control of a GUI interface based on received image data from the camera and functional block 332 for providing remote-control functions from the other inputs 122 in controller 110. Although these functional blocks are illustrated as part of the system microprocessor 328 and may be programs implemented on a general purpose processor, it will be appreciated they may be also provided as separate circuits or separately programmed microprocessors dedicated to the noted functions.

Referring to FIG. 8, a simplified process flow for converting the position data to a multi-directional control function is illustrated. As shown at 350, the process flow begins when a GUI or other multi-directional control mode is entered and the appropriate display will be provided on the display screen 112. Next the process flow activated by entry into the multi-directional control mode operates to determine the position of the controller 110 as described above. At 370 the position information is then processed and translated to cursor position information. Converting the position information to cursor position control information at 370 may employ a variety of different functions depending on the particular application and entertainment system configuration and intended use. In general, this translation operation will provide a mapping between the received position information and cursor position based on a sensitivity which may be user adjustable. In particular, the user may choose to adjust the sensitivity based on how close the screen is to the user which will affect the amount of angular motion of the controller 110 required to move the cursor a particular amount in the display screen. An automatic cursor speed sensitivity control may also be provided as described below.

Figure 9:
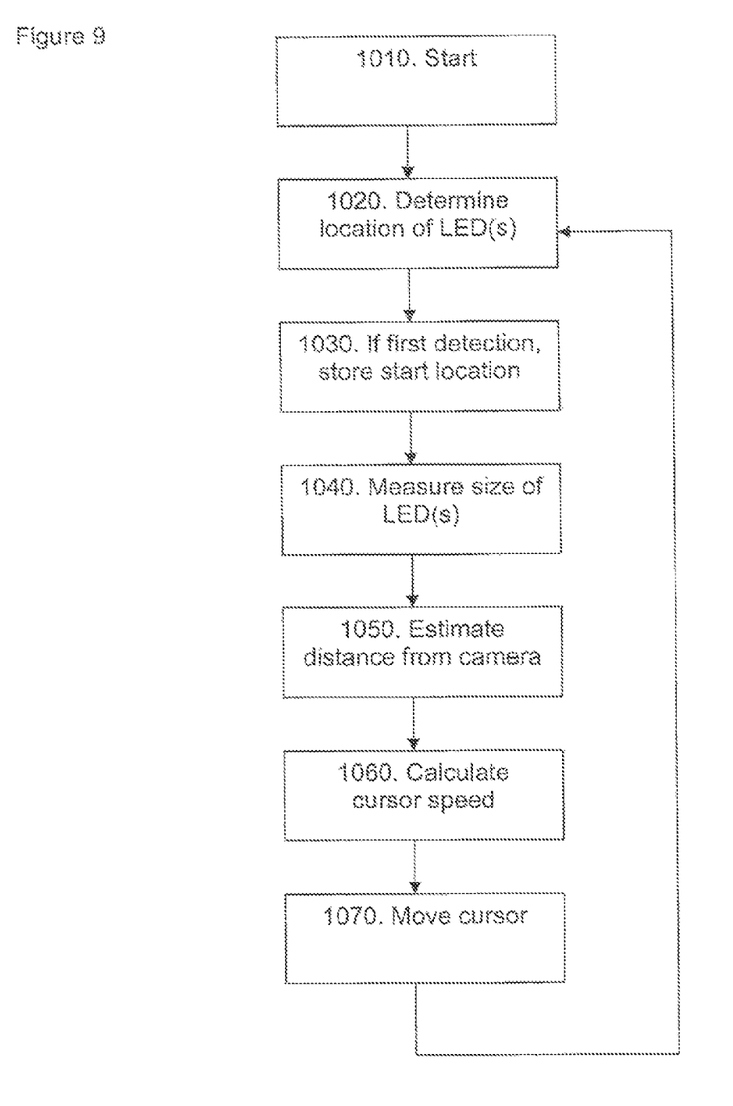
FIGS. 9-16 illustrate a detailed embodiment of an automatic cursor control algorithm for selective cursor speed control responsive to IR tracking.

FIG. 9 shows a flow diagram which illustrates an algorithm to automatically control the speed of the cursor on the screen by measuring the size and relative movement of the LED(s).

In Step 1010 the algorithm is started.

In Step 1020 the (x, y) location of one or more LEDs along with the center point of the LEDs (if more than one) is determined as described in the '001 application incorporated by reference.

In Step 1030 the starting center point of the LEDs is stored if this is the first image for some time in which LEDs are detected, as described in the '001 application incorporated by reference.

Figure 10:
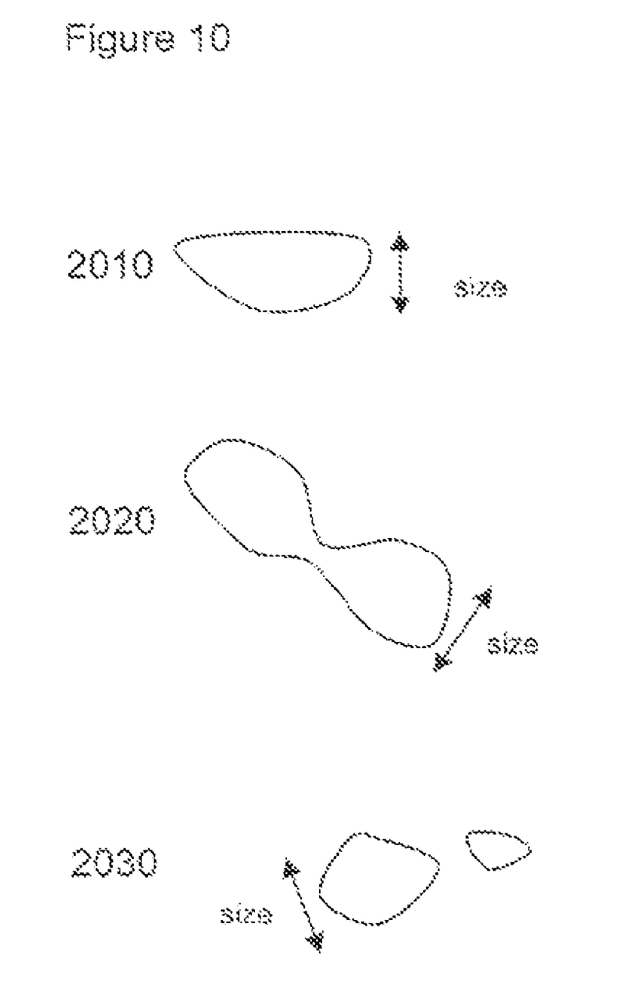

In Step 1040 the size of the LED(s) are determined by measuring the diameter of each detected LED at multiple angles. The smallest diameter over all angles is taken as the size of the LED. FIGS. 10 2010 and 2020 show examples of selecting the smallest overall diameter. If there are multiple LEDs, the largest size of all LEDs is taken. FIG. 10 2030 shows an example of selecting the largest overall LED.

In Step 1050 the distance of the remote control from the camera and screen is estimated. As the measured LED size decreases, the estimated distance increases. This calculation is based on predetermined knowledge of the size of the LEDs, and the measured size of the LED on the camera sensor, and is given by:

$$\text{Distance} = \frac{\text{Actual } LED \text{ size}}{\text{Measured } LED \text{ Size}}$$

where all units of measure are in real world units (e.g. millimeters). Since the distance of the remote from the screen is expected to remain fairly constant, the Distance calculation may be averaged over several seconds to prevent any rapid changes due to variations in the measurement of LED size.

Figure 11:
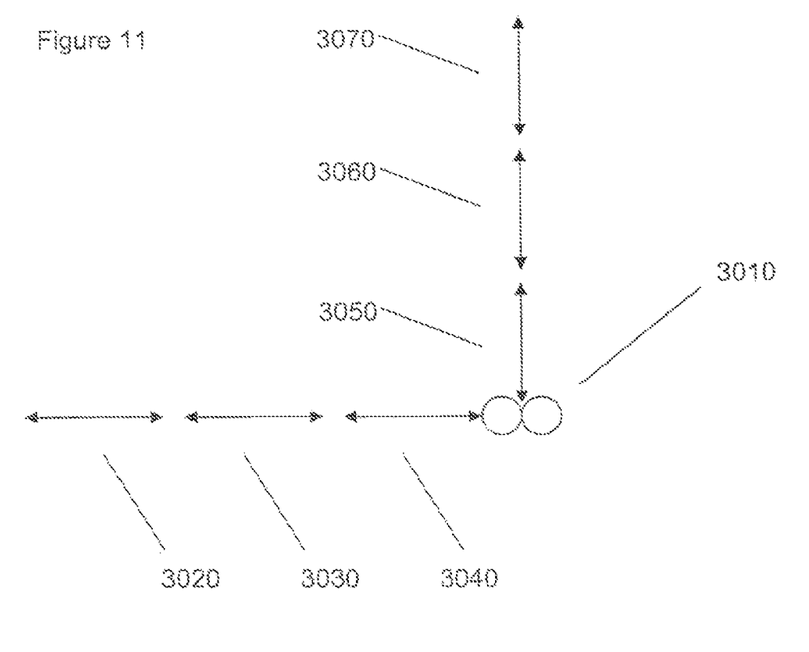
Figure 12:
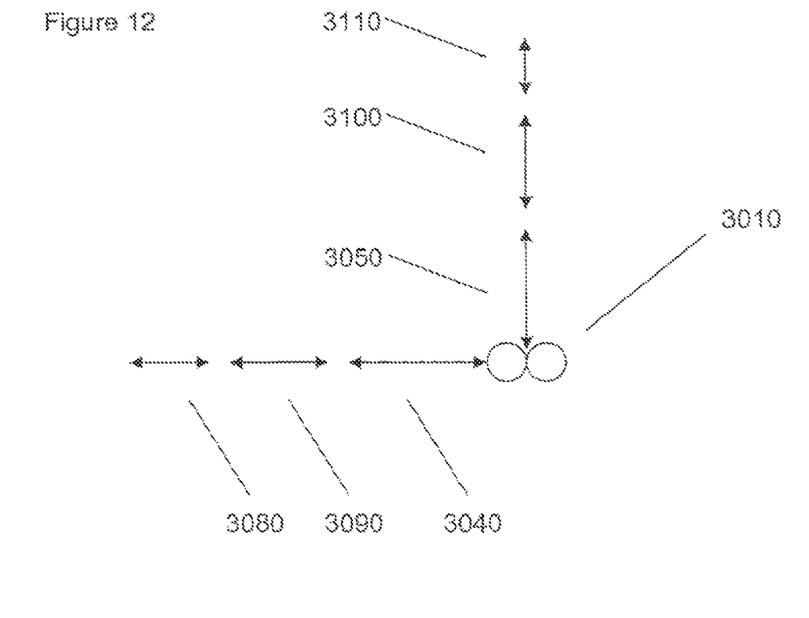
Figure 13:
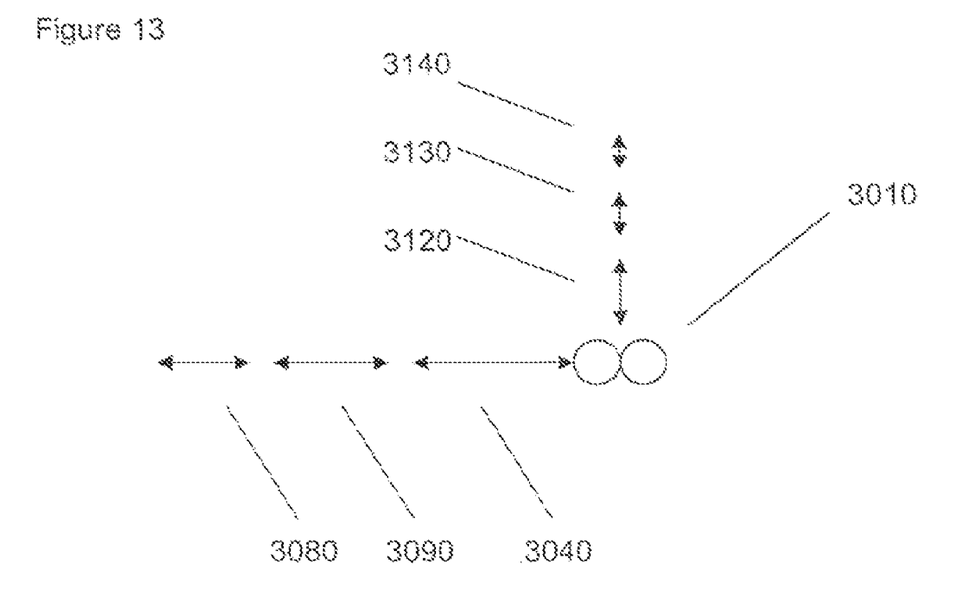
Figure 14:
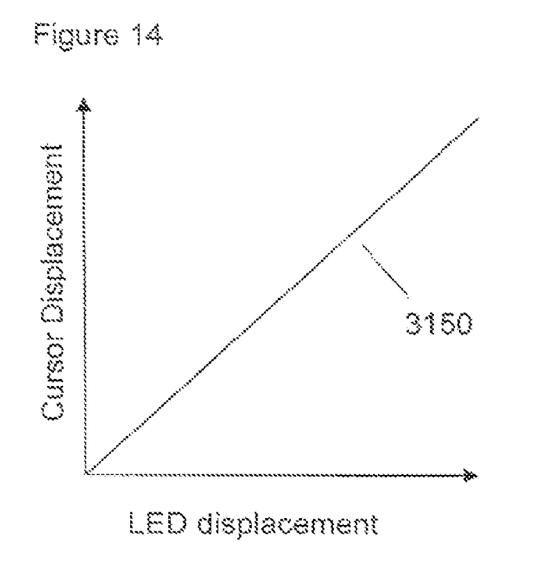
Figure 15:
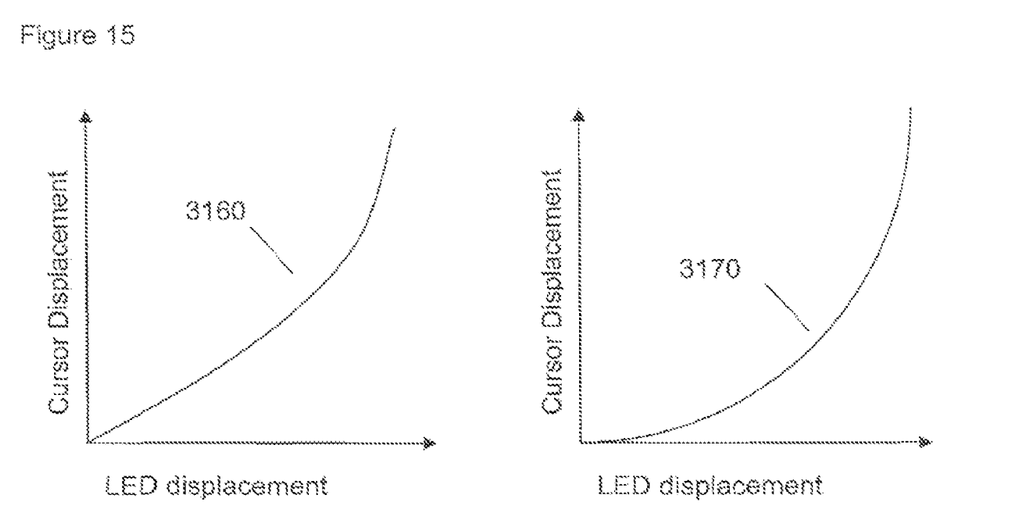
Figure 16:
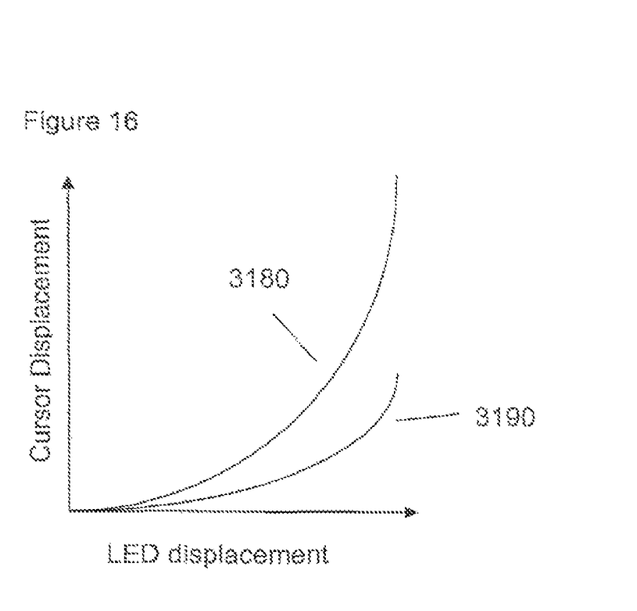

In Step 1060 a cursor speed is calculated based on the estimated distance of the remote control from the screen. As the distance increases, the cursor speed is increased to compensate for the smaller movements of the LEDs perceived by the camera at the greater distance. In this way similar hand movements will produce similar cursor movements on screen regardless of distance from the screen. The cursor speed is given by:

Cursor Speed=Distance*Scale Factor*Mapping(Displacement)

where Scale Factor is a user settable constant based on the user preference for overall cursor speed, Displacement is the horizontal and vertical displacement of the LED(s) in the camera image relative to the start location, and the Mapping function allows a linear or non-linear mapping of LED displacement to cursor displacement. With a linear mapping, the cursor displacement is proportional to the LED displacement. FIG. 11 shows the LED start position (3010), and 6 hand motions (3020, 3030, 3040, 3050, 3060, 3070) which produce similar cursor displacements. This is illustrated in graph form in FIG. 14. With a non-linear mapping, the cursor displacement accelerates as the LED displacement increases. This accounts for smaller displacements of the LED(s) perceived by the camera as the angle relative to the screen of the remote control held by the hand increases. In this way similar hand movements will produce similar cursor displacements on screen, regardless of the angle of the remote. FIG. 12 shows 6 hand motions (3080, 3090, 3040, 3050, 3100, 3110) which produce similar cursor displacements. FIG. 15 illustrates in graph form two examples of non-linear relationships (3160 and 3170) between LED displacement and cursor displacement. The acceleration may be equal in all directions, or may differ to take into account the different range of motion of the hand in the up/down/left/right directions. For example the hand has a greater range of motion in the horizontal direction than the vertical direction. In this way a similar perceived effort of hand movement in any direction will produce a similar cursor displacement on screen. FIG. 13 shows 6 hand motions (3080, 3090, 3040, 3120, 3130, 3140) which produce similar cursor displacements. FIG. 16 illustrates in graph form this relationship between LED displacement and cursor displacement for vertical (3180) and horizontal (3190) hand movements.

In Step 1070 the cursor movement is calculated from the start location of the LED(s) stored in Step 1030, and the cursor speed calculated in Step 1060. Additional details on cursor movement control are described in the '001 application, '811 application and '647 application.

It will be appreciated by those skilled in the art that the foregoing is merely an illustration of the present invention in currently preferred implementations. A wide variety of modifications to the illustrated embodiments are possible while remaining within the scope of the present convention. Therefore, the above description should not be viewed as limiting but merely exemplary in nature.

What is claimed is:

1. A method of remotely controlling position of a cursor or other object displayed on a display, comprising:
    imaging an area in front of the display, the area including a user movable remote control having an LED;
    detecting the LED location in the image;
    detecting the size of the LED beam;
    imaging the area to obtain a new image;
    detecting a new LED location in the new image;
    comparing the new location of the LED to the prior LED location to control movement of a cursor or other object displayed on the display with an amount of movement based on the LED beam size; and
    wherein the amount of movement is given by the relation Movement Speed=Distance*Scale Factor*Mapping (Displacement), where Scale Factor is a setting for overall cursor speed, Displacement is the horizontal and vertical displacement of the LED in the image relative to the start location, and the Mapping function is a linear or non-linear mapping of LED displacement to cursor displacement.

2. A method of remotely controlling position of a cursor or other object displayed on a display as set out in claim 1, wherein the movement is controlled linearly with LED movement.

3. A method of remotely controlling position of a cursor or other object displayed on a display as set out in claim 1, wherein the movement is controlled nonlinearly with LED movement.

4. A method of remotely controlling position of a cursor or other object displayed on a display as set out in claim 1, wherein the amount of movement is varied between horizontal and vertical LED movement in the image.

5. A method of remotely controlling position of a cursor or other object displayed on a display as set out in claim 1, wherein the amount of movement is increased as the detected LED beam size decreases.

6. A method of remotely controlling position of a cursor or other object displayed on a display as set out in claim 1, wherein the amount of movement is increased with estimated distance based on the detected LED beam size compared to the known LED beam size.

7. A method of remotely controlling position of a cursor or other object displayed on a display as set out in claim 1, wherein the Scale Factor is a user settable constant based on the user preference for overall cursor speed.

8. A method of remotely controlling position of a cursor or other object displayed on a display as set out in claim 1, wherein the movement control may be performed by averaging over a predetermined time to prevent any rapid changes due to variations in the measurement of LED beam size.

9. A method of remotely controlling position of a cursor or other object displayed on a display as set out in claim 1, wherein the beam size of the LED is determined by measuring the diameter of the detected LED beam at multiple angles.

10. A method of remotely controlling position of a cursor or other object displayed on a display as set out in claim 9, wherein the smallest diameter over all angles is taken as the beam size of the LED.

* * * * *